UNITED STATES PATENT OFFICE.

HARRY C. PEFFER, OF EAST ST. LOUIS, ILLINOIS, ASSIGNOR TO ALUMINUM COMPANY OF AMERICA, OF PITTSBURG, PENNSYLVANIA, A CORPORATION OF PENNSYLVANIA.

RECOVERY OF SODA IN THE MANUFACTURE OF ALUMINA.

938,270. Specification of Letters Patent. Patented Oct. 26, 1909.

No Drawing. Application filed March 5, 1909. Serial No. 481,381.

*To all whom it may concern:*

Be it known that I, HARRY C. PEFFER, a citizen of the United States, residing at East St. Louis, St. Clair county, Illinois, have invented a new and useful Improvement in the Recovery of Soda in the Manufacture of Alumina, of which the following is a specification.

My invention relates particularly to a process for the manufacture of alumina in which bauxite is digested with carbonate of soda, lime, and sufficient water, as described in patent of Charles M. Hall, No. 663,167, dated December 4th, 1900, and provides a novel and efficient means for the recovery of the soda which becomes combined with the red mud in this process, and which has hitherto been lost. In carrying out the process of the said patent, a certain amount of soda is rendered insoluble by combination with silica, alumina or lime, in the solid residuum from the digester process. I have discovered that by adding to this solid residuum—known as red mud—a certain amount of caustic lime, and heating in a digester with water to about 350° C. the soda is all rendered soluble and is removed.

I have carried out the process in the following manner with good results, and give the figures for a laboratory operation, which can readily be enlarged to an industrial scale. I take 400 grams of red mud by dry weight, 100 grams of anhydrous caustic lime, and 1,000 cubic centimeters of water. The mixture is put into a closed digester and heated at a pressure of 100 pounds to the square inch for one hour. As high as 96 per cent. of the soda present in the mud may be in this manner recovered in a soluble form, and is removed from the red mud by merely filtering and washing.

I do not limit myself to any particular proportions of the materials used, as other proportions than those named may give good results; nor do I limit myself to any particular pressure. In fact, satisfactory results may, to an extent at least, be obtained by heating at a lower temperature and for a longer period, even without pressure. My invention is also not limited to the method of the patent above referred to, but may be used in the treatment of any red mud residuum left from the digestion of bauxite with caustic soda liquor, whether containing lime or not.

What I claim as my invention and desire to secure by Letters Patent is:

1. The method of recovering soda from the red mud residuum in the manufacture of alumina by the alkaline process from bauxite, which consists in mixing the red mud with lime and water and heating so as to render the soda soluble, and then filtering off the soda solution.

2. The method of recovering soda from the red mud residuum left in the manufacture of alumina from bauxite by the alkaline process in which lime is used, which consists in adding additional caustic lime to the red mud and digesting the mixture with water under pressure, thereby rendering the soda soluble and then filtering and separating the soda.

In testimony whereof, I have hereunto set my hand.

HARRY C. PEFFER.

Witnesses:
EDNA A. RAGLAND,
I. M. CHAMBERLIN, Jr.